United States Patent [19]

Matsushima et al.

[11] Patent Number: 5,554,466
[45] Date of Patent: Sep. 10, 1996

[54] COLOR FILTER AND METHOD OF PREPARATION

[75] Inventors: Fumiaki Matsushima; Yoshihiro Ohno; Shigeyuki Ogino; Kuniyasu Matsui, all of Suwa, Japan

[73] Assignee: Seiko Epson Corporation, Tokyo, Japan

[21] Appl. No.: 406,263

[22] Filed: Mar. 17, 1995

Related U.S. Application Data

[62] Division of Ser. No. 183,204, Jan. 18, 1994, Pat. No. 5,399,450, which is a continuation of Ser. No. 552,274, Jul. 12, 1990, abandoned, which is a continuation-in-part of Ser. No. 344,636, Apr. 28, 1989, abandoned.

[30] Foreign Application Priority Data

| | | | |
|---|---|---|---|
| Jul. 12, 1989 | [JP] | Japan | 179504 |
| Jul. 27, 1989 | [JP] | Japan | 194497 |
| Nov. 8, 1989 | [JP] | Japan | 290519 |
| Mar. 20, 1990 | [JP] | Japan | 70308 |
| Apr. 12, 1990 | [JP] | Japan | 96913 |
| Apr. 16, 1990 | [JP] | Japan | 99528 |
| Apr. 16, 1990 | [JP] | Japan | 99529 |
| Apr. 19, 1990 | [JP] | Japan | 101110 |

[51] Int. Cl.$^6$ .................................................. G03F 9/00
[52] U.S. Cl. .................. 430/7; 430/321; 430/324; 428/206; 428/207
[58] Field of Search .................. 430/7, 321, 324; 428/206, 207

[56] References Cited

U.S. PATENT DOCUMENTS

| | | | |
|---|---|---|---|
| 3,474,020 | 7/1965 | Tulagin et al. | 204/181 |
| 3,915,703 | 10/1975 | Mori et al. | 96/1.7 |
| 4,122,053 | 10/1978 | Murphy et al. | 524/320 |
| 4,639,088 | 1/1987 | Suginoya et al. | 350/339 F |
| 4,670,188 | 6/1987 | Iwasa | 252/513 |
| 4,714,636 | 12/1987 | Yokono et al. | 428/1 |
| 4,787,716 | 11/1988 | Kato et al. | 350/357 |
| 4,853,296 | 8/1989 | Fukuyoshi | 428/623 |

FOREIGN PATENT DOCUMENTS

| | | |
|---|---|---|
| 0246334 | 11/1987 | European Pat. Off. . |
| 0340968 | 11/1989 | European Pat. Off. . |
| 57-89499 | 6/1982 | Japan . |
| 60-208280 | 10/1985 | Japan . |
| 61-200996 | 9/1986 | Japan . |
| 63-243298 | 10/1988 | Japan . |

OTHER PUBLICATIONS

Saji, T., "Electrochemical Formation of a Phthalocyanine Thin Film by Disruption of Micellar Aggregates", *Chemistry Letter*, pp. 693–696 (1988).

Hoshino, K., et al. "Electrochemical Formation of an Organic Thin Film by Disruption of Micelles", *Journal of the American Chemical Society*, vol. 109, pp. 5881–5883 (1987).

Saji, T., "Reversible Formation and Disruption of Micelles by Control of the Redox State of the Surfactant Tail Group", *J. Chem. Soc., Chem. Commun.*, pp. 856–866.

Hoshino, K., et al. "Electrochemical Formation of Thin Film of Viologen by Disruption of Micelles", *Chemistry Letters*, No. 7, pp. 1439–1442 (1987).

*Primary Examiner*—S. Rosasco
*Attorney, Agent, or Firm*—Stroock & Stroock & Lavan

[57] ABSTRACT

A color filter formed in accordance with the invention is formed by depositing a thin film of organic pigment an on electrode by electrochemical methods. An organic pigment is included in an aqueous micellar solution that includes a surfactant that has redox reactivity. The surfactant preferably has a metallocene such as ferrocene at the hydrophobic terminal end group. A transparent substrate having a transparent electrode thereon is emersed in the micellar solution. Voltage is applied to the transparent electrode and the organic pigment will form on the transparent electrode. Conductive particles, polymer material or conductive polymer material can be included with or on the pigment. Alternatively, the polymer or conductive polymer can be layered.

20 Claims, 2 Drawing Sheets

COLOR FILTER AND METHOD OF PREPARATION

CROSS-REFERENCE TO RELATED APPLICATION

This is a division of U.S. Pat. No. 5,399,450, filed as application Ser. No. 08/183,204 on Jan. 18, 1994, which is a continuation of application Ser. No. 07/552,274, filed Jul. 12, 1990 (abandoned), which is a continuation-in-part of application Ser. No. 344,636, filed Apr. 28, 1989, now abandoned.

BACKGROUND OF THE INVENTION

The invention relates generally to a color filter and more particularly to a color filter formed by electrochemical methods for a color image display device such as a liquid crystal panel. For example, a color filter described in U.S. patent application Ser. No. 07/344,636 filed Apr. 4, 1989 is formed by first dispersing an organic pigment in an aqueous micellar solution. The solution includes surfactant that has redox reactivity to form colloids. The solution is then electrolyzed to deposit the organic pigment on a transparent electrode that is formed on a transparent substrate.

When a liquid crystal panel is required to have high liquid crystal driving properties, it is undesirable to have a loss of applied voltage. The organic pigment formed on the driving electrode typically has a high resistance and leads to a loss of applied voltage. This diminishes the driving properties of the liquid crystal display device.

Conventional organic pigment films have other drawbacks. The organic pigment films are formed of fine particles and the adhesion between the particles and the substrate and among the particles is due to physical adsorption which is a weak force. Portions of the pigment film can peel off after film formation, during washing procedures such as those employing ultrasonic waves, when the panel is formed and during the rubbing treatment for orienting the liquid crystal material. If only an upper portion of the film peels off, the uneven film surface can lead to insufficient orientation of the liquid crystal material and non-uniform contrast.

The thickness of a pigment film is set to optimize the color tone. The thickness of the red, green and blue (for example) films can differ by about 0.5 μm between the thickest and thinnest film. If these films are included in a panel that includes super twisted nematic (STN) type liquid crystal material, an uneven display having contrast fluctuations can occur because of the non-uniform (±0.05 μm) cell gaps. Accordingly, it is necessary to form each of the thin film color filters with the same thickness to have uniform liquid crystal cell gaps.

When a color filter is formed as described in U.S. patent application Ser. No. 07/344,636, the color pigment thin film will form wherever the electrode is in contact with the micellar solution. Accordingly, a pigment thin film will form on a sealing portion to which a reference electrode is adhered or to a portion of a driving IC that is connected during the panel forming procedure. The presence of pigment in these locations reduces the durability of the panel because there will be insufficient adhesion at the sealing portions of the panel and the IC can be inadequately connected.

To alleviate this problem, the pigment film can be wiped from the sealing portion and the IC connection portion. However, this takes additional steps and it can be difficult to completely remove the pigment film. As with the other drawbacks, this can lead to increased cost and a reduction in quality.

Accordingly, it is desirable to provide an improved method of forming a color filter and a color filter which do not have the shortcomings noted above.

SUMMARY OF THE INVENTION

Generally speaking, in accordance with the invention, a color filter is provided that is formed by depositing a thin film of organic pigment an on electrode by electrochemical methods. An organic pigment is included in an aqueous micellar solution that includes a surfactant that has redox reactivity. A transparent substrate having a transparent electrode thereon is emersed in the micellar solution. Voltage is applied to the transparent electrode and the organic pigment will form on the transparent electrode. Conductive particles, polymer material or conductive polymer material can be included in the pigment thin film and can be codeposited with the pigment or layers of polymer material or conductive polymer material can be disposed on layers of pigment. The transparent electrode is formed in a predetermined pattern and can be the anode so that the micelle is oxidized, whereby the organic pigment will deposit on the transparent electrode.

Accordingly, it is an object of the invention to provide an approved color filter and method of forming a color filter by electrochemically depositing a thin film of organic pigment on a transparent electrode.

Another object of the invention is to provide a thin film formed of an organic pigment that is electrically conductive.

A further object of the invention is to provide color films having uniform thickness.

Still another object of the invention is to provide color films with a smooth surface of uniform thickness.

Still a further object of the invention is to electrolytically form a pigment thin film on a transparent electrode of a liquid crystal panel without depositing pigment at sealing portions or IC connecting portions.

Yet another object of the invention is to provide a color filter with strong adhesion properties.

Still other objects and advantages of the invention will in part be obvious and will in part be apparent from the specification and drawings.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

A color filter in accordance with the invention is formed by depositing a thin film of organic pigment an on electrode by electrochemical methods. In a preferred embodiment, an insoluble or sparingly soluble organic pigment is included in an aqueous micellar solution that includes a surfactant having redox reactivity. The surfactant preferably has a metallocene group, such as ferrocene at the hydrophobic terminal end group.

A transparent substrate having a transparent electrode selectively deposited thereon is immersed in the micellar solution. Voltage is applied to the transparent electrode and the organic pigment will form on the transparent electrode. Additives, such as conductive particles, polymer material or conductive polymer material can be included within or on the pigment layer. In one preferred embodiment the additive is preferably not chemically combined to form a reaction product with either all of or any of the pigment so that the ratio of pigment to additive in the thin film can be selectively controlled. Alternatively, the thin film can include layers of the polymer or conductive polymer. The term polymer as used herein includes conductive polymer, non-conductive polymer and polymer precursor material. The transparent electrode is formed in a predetermined pattern and can be the anode so that the micelle is oxidized, whereby the organic pigment deposits on the transparent electrode.

Thin films were prepared in accordance with the invention by preparing an electrolytic solution including a surfactant which is oxidizable, and preferably also reducible by electrolysis. The solution is an aqueous micellar solution of a surfactant which is at least positively charged by electrolytic oxidation and preferably also negatively charged by electrolytic reduction. A supporting electrolyte is dissolved in the aqueous solution. A quantity of fine particles of a functional material which can be sparingly soluble or insoluble in water is dispersed in the aqueous solution in a colloidal state due to the action of the surfactant. This functional material will form the desired thin film. Because the composition of the thin film can be selected, thinner more acceptable films can be deposited than if the material must be combined with an unacceptable quantity of some type of carrier.

(1) Increasing The Conductivity Of The Organic Pigment Film

When preparing an electrolyte, fine particles of conductive material can be dispersed and included in the colloidal dispersion with the organic pigment. The conductive material will be co-deposited with the organic pigment which will reduce the resistivity of the deposited thin film. The conductive material can be formed from fine particles of ITO $SnO_2$, SNO, ZnO and carbon, for example. When conductive oxides are employed, it is preferable to effect hydrophobic treatment on the surface of the particles.

In another embodiment of the invention, a pigment film is formed on the transparent electrode and a film of conductive polymer material is formed in at least void portions of the pigment film and on the surface of the film. Electrolytic polymerization can be carried out to deposit the conductive polymer material. The pigment film on the substrate will typically be formed of particles having a primary particle diameter of about 0.1 μm which leads to a structure having voids between pigment particles. A conductive polymer can be deposited in the voids between the pigment particles. Accordingly, a conductive network structured is formed in the pigment film to increase the conductivity of the thin film.

The color tone of films that include too much conductive polymer can be unsatisfactory because the polymer can interfere with the color tone of the filter. Accordingly, the quantity of polymer in the film should be adjusted so that the deterioration of color tone is tolerable. Clear polymers can be employed.

Monomers that are well suited for electrolytic polymerization can include compounds having unsaturated bonds such as pyrrol or pyrrol derivatives; aniline and aniline derivatives; and thiophene and thiophene derivatives.

In one preferred embodiment, the conductive material added to the thin film can lower the resistivity of the film to between about $1\times10^5$ Ω.cm to $1\times10^7$ Ω.cm.

(2) Increasing Adhesion of The Film

It is beneficial to enhance the adhesiveness among film particles and between the film particles and the electrode. A first method to accomplish this goal is to employ electrolytic polymerization. The electrolytic polymerization method described above to impart conductivity has the added benefit of strengthening the pigment thin film.

A second method for increasing adhesion employs electrodeposition of an aqueous solution of a material such as a polymer precursor such as acrylic acid which can be electrically adsorbed onto an electrode. A pigment film is formed on an electrode and this is used as an anode during electrolysis of a polymer precursor such as acrylic acid which is electrodeposited on the pigment film. The solution can also include melamine which is dissolved and deposited simultaneously so that the curing reaction during post-treatment is accelerated.

In another embodiment, a polymer precursor or a polymer molecule can be coated on or impregnated in the pigment film by a coating method and then cured by post-treatment by heat or UV treatment, for example, to form a polymer material. Examples of acceptable coating methods include spin coating, roll coating, curtain coating, flexographic printing, screen printing, offset printing and spray coating.

In another embodiment, the substrate and pigment film can be immersed in a polymer precursor solution or in a polymer solution. This impregnates the polymer precursor or polymer in the pigment film.

A polymer material structure formed according to these methods preferably is sufficiently impregnated in the pigment film and has a thickness and quantity that will not lower the liquid crystal driving properties of the pigment film. Acceptable materials can include heat polymerization, oxidation polymerization, photocuring and solvent evaporation types of polymerization materials. The most preferable materials have high transparency and no coloring after they are polymerized or cured.

(3) Smoothing the Pigment Film Surface

To prevent upper portions of thick films from peeling from the remainder of the film, it is preferable to repeat the film forming procedure and the polymer formation procedure several times to provide a film having a smooth surface. The polymers described for improving the adhesiveness of the film can be employed. The curing procedure as the post-treatment of the polymer material may be carried out after each deposition procedure or it may be carried out all at once as a final procedure.

In another embodiment for electrochemically forming a polymer, a cationic polymer precursor is dissolved in the electrolyte for forming the pigment film. The cationic polymer must be capable of effecting electrodeposition. As a first step, electrolysis is carried out at a potential not less than the micelle destruction potential of the surfactant, but not more than the film forming potential of the polymer precursor. Accordingly, during the first step only organic pigment is deposited. During a second step, the potential is high enough to form a film that includes the organic pigment and the polymer material. The first and second steps are repeated until a pigment film having the desired thickness is formed.

By repeating the first and second steps, the composition ratio of the polymer precursor and the pigment will be different than from the process in which the polymer precursor and pigment are dispersed in an electrolyte and codeposited. Another difference is that by repeating the first and second steps, the polymer precursor permeates the pigment film and the adhesiveness of the film can be retained.

(4) Forming The Films With Uniform Thickness

It is important that each color film for a liquid crystal panel have uniform thickness, especially with STN liquid crystal material, to prevent fluctuations in contrast. In one embodiment of the invention, a pigment film is formed to yield a selected color tone and a transparent polymer material is electrochemically formed on the pigment film to provide the selected film thickness. Accordingly, by selectively depositing the transparent polymer material on the pigment film, uniform thickness of each different color layer can be attained.

In another embodiment, fine particles of a transparent polymer can be dispersed in an electrolyte including the pigment material and the transparent polymer and pigment particles are codeposited. Accordingly, if the red (R) film of an red (R), green (G), blue (B) filter is undesirably thin, the R film can be thickened by increasing the proportion of polymer to the proportion of pigment for the R color film.

The polymers to be included are preferably both insoluble in water and highly hydrophobic. It is also preferable that the polymer material is atomized to at least 1 μm or less with a sand mill. Furthermore, those that are not atomized, including polymers with low degree of polymerization or oligomers for example, may be dispersed in a micellar solution.

(5) Preventing Formation of Pigment Film At Sealing Portions and Driving IC Connection Portions A transparent electrode is patterned in a predetermined configuration on a transparent substrate. A resist is then formed with a predetermined pattern on the substrate at portions where formation of the pigment film is not desired. The resist layer can be patterned by photolithographic methods and negative-type or positive-type resist that is UV ray curable or of a decomposition type is acceptable. The resist pattern can also be formed by flexographic printing, screen printing, offset printing and other appropriate methods. The resist material can be photoresist or heat or electron radiation curing-type.

The substrate having an electrode layer and a resist layer thereon is immersed in a micellar electrolyte and pigment layers are formed electrolytically. When the substrate is removed from the solution, the micellar electrolyte can unintentionally remain at the resist and on the substrate. Thin lines of pigment film are likely to be generated along the resist pattern. Accordingly, the substrate should be washed sufficiently with water after the electrolysis or the resist should include a water repelling substance. Suitable water repellents include silicone series resin, fluoride series resin, silicone series surfactant, fluoride series surfactants and the like. The ratio of resist to water repellant can vary but it is typically about 0.005% by weight or higher. The upper limit can be the range at which the water repellant can be mixed with the resist without impairing the characteristics of the resist. After the pigment film is formed by electrolysis the resist is removed.

The method of preparation and the color filter in accordance with the invention will now be explained in greater detail with reference to the following examples. The examples are presented for the purpose of illustration only, and are not intended to be construed in a limiting sense.

EXAMPLE 1

A conductive red pigment film was prepared as follows. The red organic pigment was Chromophthal A3B produced by Ciba Geigy AG and the conductive material was $SnO_2$ powder which had been subjected to hydrophobic treatment. The $SnO_2$ powder was dispersed in an isopropyl alcohol solution containing 5% of aminosilane (trade name: SH 6020, produced by Toray Co.) using an ultrasonic wave. The isopropyl alcohol was volatilized and the remaining solid was sintered at 120° C. to introduce an organic chain on the surface of the $SnO_2$ solid. The sintered product was pulverized by a sand mill to obtain powder having a particle size of 0.2 μm or less.

An electrolyte was prepared with the following composition:

| | |
|---|---|
| 1. Surfactant which can be at least oxidized by electrolysis: Ferrocenyl PEG (produced by Dojin Kagaku Co.) | 3 g |
| 2. Supporting electrolyte: LiBr | 5.24 g |
| 3. Red organic pigment: Chromophthal A3B | 5 g |
| 4. $SnO_2$ fine particles subjected to hydrophobic treatment | 5 g |

These components were poured into 1 liter of pure water and components 3 and 4 were dispersed by an ultrasonic wave homogenizer as fine particles for film forming material. This dispersion was allowed to stand for 2 hours and the supernatant was collected to use for electrolysis.

The film forming substrate was a glass substrate having a 0.1 μm thick pattern of ITO formed thereon. This glass substrate was the anode and a platinum plate was used as a cathode. Electrolysis was conducted with +0.4 V (vs. S.C.E.) for 30 minutes. A 1.5 μm thick thin film of red pigment and $SnO_2$ were codeposited. The film had a resistivity of $1\times10^6$ Ω.cm.

COMPARATIVE EXAMPLE 1A

The same electrolyte was used, but without $SnO_2$ powder. Electrolysis was conducted under the same conditions for 30 minutes. A 1.0 μm thick thin film of red pigment was obtained but the film had a resistivity of $1\times10^{10}$ Ω.cm. Accordingly, a $10^4$-fold increase in conductivity was provided to the pigment by including the $SnO_2$ powder.

Using the pigment +$SnO_2$ film of this Example, a liquid crystal cell was prepared and the driving property of the liquid crystal was confirmed. It exhibited substantially the same liquid crystal driving property as when no pigment film is formed on the electrode.

It was also confirmed that the color tone of the pigment film was not unacceptably changed when the $SnO_2$ powder was codeposited. The thin film could be acceptably used as a color filter for a liquid crystal display.

EXAMPLE 2

A 1.4 μm thick film of ITO fine particles and red pigment was codeposited as in Example 1. The resistivity of the film was $1 \times 10^5$ Ω.cm, and the beneficial effects of a pigment thin film of the present invention were confirmed.

A 1.7 μm thick film of ZnO fine particles and red pigment were codeposited. As in Example 1, the ZnO was subjected to hydrophobic surface treatment by a fluorine series surfactant. The resistivity of the thin film was $1 \times 10^7$ Ω.cm, and the beneficial effects of the invention were confirmed.

EXAMPLE 3

A glass substrate having a diagonal of 2.5 inches was provided as a transparent substrate. An ITO film transparent electrode was formed thereon by sputtering 300 stripe-like electrodes each having a width of 100 μm and a line distance pitch of 130 μm.

The following micellar colloidal aqueous solutions of red, green and blue organic pigments having compositions shown in Table 1 were prepared. Each pigment film was formed by electrolysis at the anode side.

TABLE 1

| Pigment | Pigment concentration | Surfactant | Supporting electrolyte |
|---|---|---|---|
| 1 Red | 6 g/l | 1.5 mM | 0.05M |
| 2 Green | 14 g/l | 1.5 mM | 0.05M |
| 3 Blue | 7 g/l | 1.0 mM | 0.05M |

Surfactant: Ferrocenyl PEG (produced by Dojin Kagaku Co.)
Supporting electrolyte: LiBr
Red Pigment: Anthraquinone series pigment
Green Pigment: Halogenated copper phthalocyanine
Blue Pigment: ε type copper phthalocyanine The electrolysis potential was +0.4 V (vs. S.C.E.) and electrolysis time was adjusted so that the red pigment film was 0.8 μm thick, the green film was 0.8 μm thick and the blue film was 0.7 μm thick. The pigment layer was formed by selectively passing a current to the end of the electrode pattern during electrolysis to form repeating stripe patterns of red, green and blue. After film formation, the formed material was sintered at 180° C. for 30 minutes to improve adhesiveness.

Electrolytic polymerization was conducted to form a conductive polymer structure on the pigment layers simultaneously. An electrolytic polymerization solution was prepared, including propylene carbonate as a solvent, having the composition shown below:

| N-methylpyrrol | 0.1M |
|---|---|
| Lithium perchlorate | 0.2M |

A silver oxide electrode was used as a reference electrode and electrolytic polymerization was conducted with a constant potential of +1.0 V for 3 minutes to form conductive polymer (poly-N-methylpyrrol) at voids between pigment particles and additionally on the pigment layer with a thickness of 0.05 to 0.1 μm. After washing with pure water, the resulting material was dried at 150° C. for 30 minutes.

The conductive polymer employed generally has a dark brown color when it is formed too thick on the pigment layer and the color tone of the pigment layer is thereby lowered. Therefore, the conductive polymer film was formed to have a thickness which does not affect the color tone and a color filter in accordance with the present invention was prepared.

Using an opposite substrate having a MIM element formed thereon, a TN type active matrix liquid crystal panel was made by a predetermined liquid crystal panel formation process.

After confirming the driving characteristics of the liquid crystal, it was confirmed that the liquid crystal panel had substantially the same characteristics as where no pigment layer was formed. There was no loss in applied voltage.

EXAMPLE 4

A pigment layer was formed as in Example 3 and electrolytic polymerization was then conducted. An electrolyte with pure water was formed with the following:

| aniline | 0.1M |
|---|---|
| magnesium perchlorate | 0.2M |

Constant potential electrolysis was conducted with an electrolytic potential of +0.5 V (vs. S.C.E.) for 3 minutes to form a conductive polymer (polyamine). The film thickness was as in Example 3.

As in Example 3, a TN type active matrix liquid crystal panel was prepared and evaluated. The panel exhibited good liquid crystal driving properties as in Example 3.

EXAMPLE 5

A pigment layer was formed as in Example 3 and then electrolytic polymerization was conducted.

An electrolyte was formed with:

| Pyrrol | 0.1M |
|---|---|
| LiBF$_4$ | 0.2M | dissolved in propylene carbonate.

Constant potential electrolysis was conducted with an electrolytic potential of +1.0 V (vs S.C.E.) for 2 minutes to form a conductive polymer (polypyrrol). The film thickness was formed to be substantially the same as in Example 3.

As in Example 3, a TN type active matrix liquid crystal panel was prepared and the effects of the invention were confirmed.

EXAMPLE 6

A glass substrate was provided having a diagonal of 5 inches. An ITC film transparent electrode was formed thereon by sputtering 300 stripe-like electrodes, each having a width of 100 μm by a photolithographic method.

Micellar colloidal aqueous solutions of red, green blue organic pigments were prepared having the compositions shown in TABLE 2. Each pigment film was formed by electrolysis.

TABLE 2

| Pigment | Pigment concentration | Surfactant | Supporting electrolyte |
|---|---|---|---|
| 1 Red | 6 g/l | 1.5 mM | 0.05M |
| 2 Green | 14 g/l | 1.5 mM | 0.05M |
| 3 Blue | 7 g/l | 1.5 nM | 0.05M |

Surfactant: Ferrocenyl PEG (produced by Dojin Kagaku Co.) (which can be oxidized and reduced by electrolysis)
supporting electrolyte: LiBr
Red Pigment: Anthraquinone series pigment
Green Pigment: Halogenated chlorinated copper phthalocyanine
Blue Pigment: α type copper phthalocyanine The electrolysis potential was +0.4 V (vs. S.C.E.) and electrolysis time was adjusted so that each of the pigment films had a thickness of 1.0 µm. The pigment layers were formed by selectively passing a current during electrolysis to yield a repeating stripe pattern of red, green and blue. After film formation, the colored layers were sintered at 180° C. for 30 minutes.

The substrate was then immersed in a polymer precursor solution. Electrodeposition of the polymer precursor was conducted by utilizing the transparent electrode with the pigment thin films as an electrode for electrodeposition. The polymer precursor solution contained acrylic acid and melamine with the ratio of 7:3, isopropyl alcohol and butyl cellosolve (Produced by K.K. Shimizu) The concentration of acrylic acid+melamine was set to 5% by weight.

Electrodeposition was conducted on the transparent electrode having the pigment thin films as an anode by applying +3.5 V between an opposite electrode made of platinum for 5 minutes. After electrodeposition, the deposited material was washed in pure water for 30 seconds, dried by a spin dryer and sintered at 180° C. for 30 minutes. An acryl-melamine polymer was formed in the pigment films to a thickness of 0.05 µm.

That the polymer material was formed in the pigment material was confirmed by an adhesive test. Scotch tape was adhered to the color filter and removed without peeling off filter material.

The pigment films were immersing in an alkali defatting solution (60° C.) and ultrasonic wave washing was conducted. A conventional pigment film exhibited partial peel off after 20 seconds. The pigment films of this Example did not exhibit this problem.

The pigment layers were subjected to the liquid crystal panel formation process, but no problems occurred. The layers were not damaged by rubbing treatment.

A TN type color liquid crystal panel was prepared and the driving characteristics of the liquid crystal were examined. No difference was observed, compared with a conventional pigment film single material.

EXAMPLE 7

Three colors of pigment thin films were formed as in Example 6. The substrate and pigment thin films were immersed in a monomer solution capable of effecting electrolytic polymerization and using the substrate as an anode, electrolytic polymerization was conducted. The monomer solution included propylene carbonate as a solvent and contained 0.2M of N-methylpyrrol and 0.2M of lithium perchlorate as a supporting electrolyte. Electrolytic polymerization of N-methylpyrrol was conducted using platinum plates as opposite electrodes with constant current polymerization of 0.05 mA/$Cm^2$ for one minute. After conducting electrolytic polymerization, the substrate was dried at 150° C. for 10 minutes.

Poly-N-methylpyrrol was formed in the pigment films and only 0.1 µm of poly-N-methylpyrrol was formed on the films. While poly-N-methylpyrrol usually has a dark brown color, the polymer has had substantially no effect on the light transmittance of the color filter because the film thickness was so thin.

The adhesiveness of the pigment thin films were as good as in Example 6. The embodiment of this Example provides a benefit of greatly improved liquid crystal driving property as in previous examples. Because, poly-N-methylpyrrol is a conductive organic material, the voltage loss due to the resistivity of the pigment thin film is reduced.

EXAMPLE 8

The electrodepositing method of Example 6 was applied again to each color pigment thin films of Example 6 when effecting formation and sintering thereof and the same good results as in Example 6 were obtained.

EXAMPLE 9

The electrodepositing method of Example 6 was applied to from each color of the pigment thin films of Example 6. Between formation steps, the substrate was washed with water but not sintered. The procedure was repeated three times to prepare a three color filter. The same good results as in Example 6 were obtained.

EXAMPLE 10

The electrodepositing method of Example 7 was applied again to each color of pigment thin film of Example 7 when effecting formation and sintering thereof and the same good results as in Example 7 were obtained.

EXAMPLE 11

The electrodepositing method of Example 7 was applied again to each color of pigment thin films of Example 7 when effecting formation and washing with water without sintering. The procedure was repeated three times to prepare three colors of a color filter. The same good results as in Example 7 were obtained.

EXAMPLE 12

After forming three colors of pigment thin films as in Example 6, a thermosetting type polyimide precursor solution was coated on the pigment thin films by spin coating. A thermosetting type polyimide precursor solution, PSI-G7425ZSA produced by Chisso K.K. was used by diluting with ethyl carbitol to make 2% solid component concentration. After coating, it was air-dried for 30 minutes and then sintered at 200° C. for 30 minutes. The polyimide resin was impregnated in the pigment thin films due to the impregnating action of the polyimide precursor and only 0.05 µm of the polyimide film was formed on the pigment thin films.

The adhesiveness of the pigment thin film was as goods as in Example 6 and the liquid crystal driving properties were also the same.

EXAMPLE 13

After forming three colors of pigment thin films as in Example 6, a photocuring type polyimide precursor solution was coated on the pigment thin films by roll coating. PI-300 produced by Ube Industries, Ltd. was diluted with N-methyl-2-pyrrolidone to make 2% solid component concentration. After coating, it was air-dried for 30 minutes, pre-baked at 100° C. for 5 minutes and irradiated a ultraviolet ray by the UV irradiating device with an energy of 1 J/$cm^2$. Post-baking was carried out at 200° C. for 5 minutes.

The polyimide resin was impregnated in the pigment thin films due to the impregnating action of the polyimide precursor and only 0.08 µm of the polyimide film was formed on the dye thin films. The adhesiveness of the pigment thin film was as good as in Example 6 and the liquid crystal driving property was also the same.

Furthermore, regarding Examples 12 and 13, a secondary effect is that the polyimide films formed on the pigment film can be used as a liquid crystal orienting film. If coating of an oriented film is devised, it can be used as a treatment for improving adhesiveness.

In coating methods as in Examples 12 and 13, various materials can be applied. For example, if conductivity is applied to the pigment thin films by using an organic metal solution capable of forming a conductive oxide film such as $SnO_2$ or ZnO which can be formed by coating and sintering, the benefits of markedly improved liquid crystal driving property were obtained.

EXAMPLE 14

A glass substrate having a diagonal of 5 inches was provided. 300 ITO (indium tin oxide) stripe-like electrodes each having a width of 100 μm were formed by sputtering by the photolithographic method. Micellar colloidal aqueous solutions of red, green and blue organic pigments having compositions shown in Table 3 were prepared and each pigment film was formed by electrolysis.

TABLE 3

| Pigment | Pigment concentration | Surfactant | Supporting electrolyte |
|---|---|---|---|
| 1 Red | 6 g/l | 1.5 mM | 0.03M |
| 2 Green | 14 g/l | 1.5 mM | 0.03M |
| 3 Blue | 7 g/l | 1.5 mM | 0.03M |

Surfactant: Ferrocenyl PEG (produced by Dojin Kagaku Co.) (which can be oxidized and reduced by electrolysis)
Supporting electrolyte: Lithium bromide
Red Pigment: Anthraquinone series pigment
Green Pigment: Brominated chlorinated copper phthalocyanine
Blue Pigment: α type copper phthalocyanine The electrolysis potential was 0.4 V (vs. S.C.E.) and electrolysis time was adjusted so that each of the pigment film thicknesses was 1.0 μm. The pigment films were formed by selectively passing a current through a selected electrode during electrolysis to yield repeating stripe patterns of red, green and blue. After film formation, the formed material was sintered at 180° C. for 30 minutes and the pigment thin film of a repeating stripe pattern of red, green and blue was formed.

The substrate was immersed in a thermosetting type polymer precursor solution including an aqueous solution containing acrylic acid and melamine with the ratio of 7:3 and also containing isopropyl alcohol and butyl cellosolve (produced by K.K. Shimizu). The concentration of acrylic acid +melamine was adjusted to about 5% by weight. The solution also contained amines as a neutralizing agent.

The dipping time was set to 5 minutes. After the substrate was taken from the solution, it was washed in overflowing water for about 30 seconds, spin dried and then sintered at for 30 minutes. The acryl melamine polymer was formed with a network structure in the pigment thin films. The film thickness after treatment was about 1.05 μm and it was increased by only 0.05 μm compared to the thickness of a pigment film only.

The adhesive test was carried out by peeling off scotch tape from the color filter. The pigment film did not peel off. The products were immersed in an alkali defatting solution (60° C.) and ultrasonic wave washing was conducted. While the conventional color filter with a thin film peeled off partially after 20 seconds, the product of this Example exhibited no problems caused by ultrasonic wave washing for about 3 minutes or so.

The product was included in a liquid crystal panel and no problems occurred. The color layers were not damaged by rubbing treatment. Using a TN type liquid crystal material, a color liquid crystal panel was prepared and the driving characteristics of the liquid crystal were examined. No difference was observed, compared with a conventional single material film, whereby good results were obtained.

EXAMPLE 15

After forming three colors of pigment thin films as in Example 14, the substrate was immersed in a photocurable type polymer precursor solution (PI-300) using N-methyl-2-pyrrolidone as a main solvent produced by Ube Industries, Ltd. by diluting with ethylcarbitol to make 5% solid component concentration. The dipping time was 10 minutes and after removal from the solution, the substrate was washed in overflowing water for one minute then dried.

The substrate was irradiated by a UV irradiating device with an energy of 1 $J/cm^2$. Post-baking was carried out at 180° C. for 5 minutes. The polyimide resin was formed with a network structure in the dye thin films. The film thickness was increased by only 0.03 μm compared to that of only the pigment film. Adhesiveness of the dye thin film was as good as in Example 14 and the liquid crystal driving property was adequate.

EXAMPLE 16

After forming three colors of pigment thin films as in Example 14, the substrate was immersed in a polyparabanic acid solution (produced by Tonen Sekiyu Kagaku), diluted to 5% by weight. The dipping time was 10 minutes and after removal from the solution, the substrate was washed in an overflow water for one minute then spin dried. The substrate was sintered at 200° C. for 30 minutes to evaporate the solvent and to form a network structure of the polyparabanic acid resin film in the pigment thin film. The film thickness was increased by only 0.1 μm compared with that of the pigment film only. The adhesiveness of the pigment thin film was good as in Example 14 and the liquid crystal driving property was adequate.

EXAMPLE 17

A three color color filter was prepared by using the same starting materials as in Example 14, but each color of pigment thin film was prepared by coating a pigment thin film, sintering the film, immersing the substrate in a polymer precursor solution and then sintering. The procedures were repeated three times. As the results, the same good properties as in Example 14 were obtained.

EXAMPLE 18

The method of Example 17 was applied to each color of pigment thin films of Example 17, but when forming a pigment thin film, the operations of immersing the substrate in a polymer precursor solution and sintering were repeated three times, without sintering after formation of each pigment thin film, to prepare three colors of a color filter. As a result, the same good properties as in Example 14 were obtained.

EXAMPLE 19

A micellar colloidal solution of an organic pigment was prepared. The solution included 1.5 mM of ferrocenyl PEG (produced by Dojin Kagaku Co.), 7 g/l of α type copper phthalocyanine as an organic pigment and 0.05M of lithium bromide as a supporting electrolyte.

An ITO electrode formed by sputtering on a glass substrate and a Pt plate as an opposite electrode were immersed in a colloidal micellar solution and electrolysis was conducted. The electrolytic potential was 0.4 V (vs. S.C.E.). Electrolysis time was adjusted so as to become the pigment film thickness being 0.3 μm.

The glass substrate was then immersed in a polymer precursor solution for 5 minutes to impregnate the polymer precursor in the pigment films. The polymer solution was an aqueous solution (produced by K.K. Shimizu) containing acrylic acid and melamine at a ratio of 7:3. It also contained isopropyl alcohol and butyl cellosolve and the concentration of the acrylic acid and melamine had been adjusted to 5% by weight.

After immersing the substrate in the polymer precursor solution, the substrate was sufficiently washed in flowing water. The substrate was again immersed in the micellar solution and the pigment film was further formed thereon with a thickness of 0.3 μm. By repeating immersion in the micellar solution and the polymer precursor solution four times, a pigment film having a thickness of 1.2 μm was obtained and then sintered at 150° C. for 30 minutes. In the course of the film formation process, the pigment film did not peel off, and a uniform pigment film, which did not peel off by the peeling test using a scotch tape was obtained.

Figure 1:
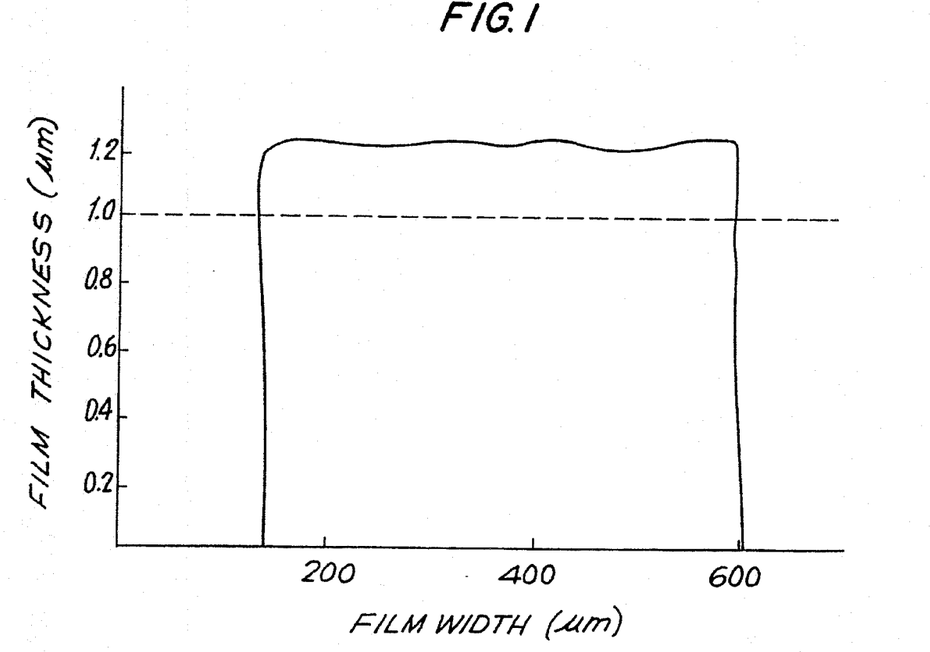
FIG. 1 is a graph of the film thickness profile of a thin film formed in accordance with the invention.

As shown in FIG. 1, a cross-sectional profile of the pigment film is shown. This figure is a result of a shape of the film measured by Alfa Step produced by Tencor Co. As seen in the figure, a smooth film surface can be obtained. This smoothness did not cause any problem such as insufficient orientation even when it had been used as a color filter of a liquid crystal panel.

EXAMPLE 20

By using the same micellar colloidal solution as in Example 19, a pigment film with a thickness of 0.25 μm was formed on an ITO electrode by the same electrolytic conditions. After the glass substrate was immersed in a photo-curable type polyimide precursor solution (PI-300 produced by Ube Industries, Ltd.) with a solid concentration of 1% (diluted with N-methyl-2-pyrrolidone) was washed with the diluting solution and air-dried for 30 minutes. It was then cured by pre-baking at 100° C. for 5 minutes, developing with a UV ray with 7 mJ/cm$^2$, and then post-baked at 200° C. for 5 minutes.

COMPARATIVE EXAMPLE 20A

Using the same substrate as in Example 19, a film of α type copper phtyalocyanine was formed by electrolysis on an ITO electrode to a thickness of 500 μm.

An aqueous micellar colloidal solution was prepared, including:

| | |
|---|---|
| Ferrocenyl PEG (produced by Dojin Kagaku Co.) | 1.5 mM |
| α type copper phthalocyanine | 7 g/l |
| Lithium bromide | 0.05M | a Pt plate was employed as an opposite electrode and electrolysis was conducted at 0.4 V (vs. S.C.E.) to form an α type copper phthalocyanine film with a thickness of 1.2 μm.

Figure 2:
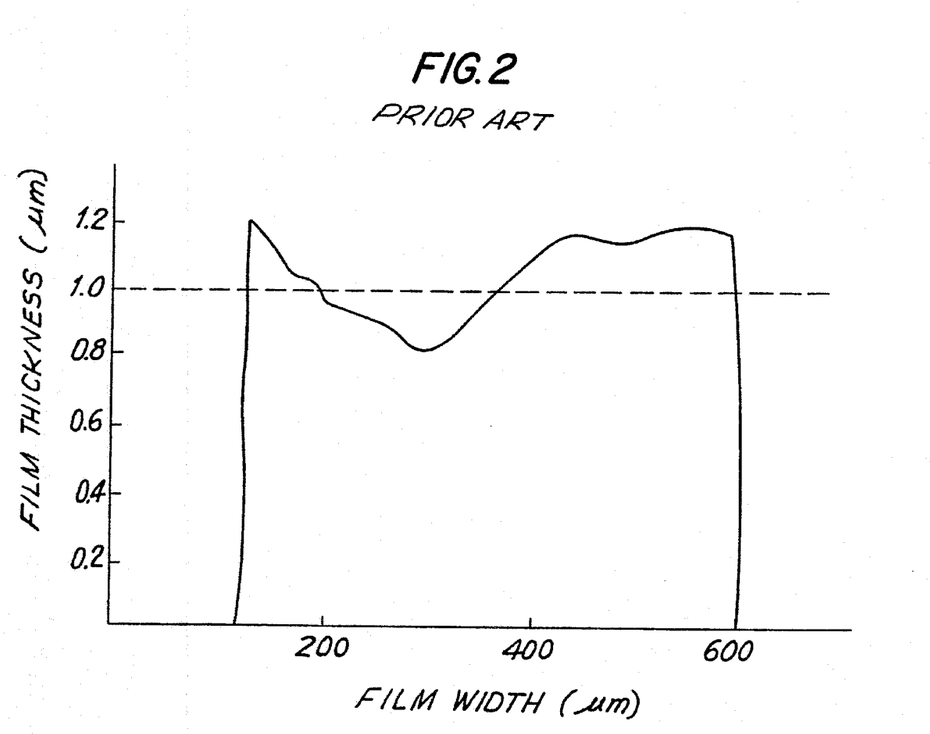
FIG. 2 is a graph of the film thickness profile of a thin film formed by conventional methods.

A cross-section of the film was measured in the same manner as in Example 19 and the results are shown in FIG. 2 which show that the film was not smooth. A liquid crystal panel was prepared according to the predetermined liquid crystal panel producing process using this substrate and orientation problems occurred on the α type copper phthalocyanine film.

EXAMPLE 21

A micellar colloidal solution of an organic pigment was prepared. The solution included 1.5 mMof ferrocenyl PEG (produced by Dojin Kagaku Co.), 10 g/l of brominated chlorinated copper phthalocyanine as an organic pigment and 0.05M of lithium bromide as a supporting electrolyte.

A pigment film was formed on an ITO electrode on a glass substrate with the same conditions as in Example 19 to a thickness of 0.2 μm by adjusting electrolysis time. The glass substrate was immersed in the same polymer precursor solution as in Example 19 and after washing with water, it was sintered at 150° C. A pigment film having a thickness of 0.8 μm was obtained by repeating the above procedure four times. Adhesiveness and smoothness of the film were also as good as in Example 19.

COMPARATIVE EXAMPLE 21A

By using the same micellar colloidal solution and ITO electrode on a glass substrate, as in Example 19, a pigment film with a thickness of 1.2 μm was formed by the same electrolysis conditions. After sintering at 180° C. for 30 minutes, the smoothness of the surface was measured and the results were as in FIG. 2. As a result, the smoothness was unsatisfactory, and the film was easily peeled off by the peeling test using scotch tape. When a liquid crystal panel was prepared by using the pigment film, orientation trouble occurred at the portion where unevenness was considerable.

EXAMPLE 22

A glass substrate having a diagonal of 5 inches was provided and an ITO film as a transparent electrode pattern was formed thereon by sputtering 300 stripe-like electrodes each having a width of 100 μm, by using the photolithographic method.

Micellar colloidal aqueous solutions of red, green and blue organic pigments having compositions shown in Table 4 were prepared.

TABLE 4

| Pigment | Pigment concentration | Surfactant | Supporting electrolyte |
|---|---|---|---|
| 1 Red | 6 g/l | 1.5 mM | 0.05M |
| 2 Green | 14 g/l | 1.5 mM | 0.05M |
| 3 Blue | 7 g/l | 1.5 mM | 0.05M |

Surfactant: Ferrocenyl PEG (produced by Dojin Kagaku Co.) (which can be oxidized and reduced by electrolysis)
Supporting electrolyte: Lithium bromide
Red Pigment: Anthraquinone series pigment
Green Pigment: Brominated chlorinated copper phthalocyanine
Blue Pigment: α type copper phthalocyanine In the three micellar colloidal solutions, a mixture of acrylic acid and melamine with a ratio of 7:3 was added in the solution to contain 0.5% by weight therein.

The pigment thin films were formed by selectively passing a current through an electrode during electrolysis to give repeated stripe patterns of blue, green and red. Electrolysis potential was made 0.4 V (vs. S.C.E.) and electrolysis time was adjusted to yield a pigment film thickness of 0.3 μm. The electrolysis potential was then made 2.0 V (vs. S.C.E.) and the electrolysis potential was applied again for a time as the polymer "soaked" into voids of the pigment film. By repeating the above procedure three times, a color filter was prepared with a stripe pattern in which each pigment film has a thickness of 1.0 μm. That is, by electrodeposition, only 0.1 μm in thickness was increased.

Thereafter, by sintering at 180° C. for 30 minutes, a color filter having good adhesiveness was obtained. In the peeling test with scotch tape adhered to the completed color filter, no peel off was caused. The surface of the color filter was extremely smooth and the problem that the pigment film peels off in the micellar colloidal solution did not occur.

When the color filter was flowed in the liquid crystal panel making process to make a panel, no problem was caused by insufficient adhesiveness and it was not damaged by rubbing treatment. Using this panel, driving characteristics of a liquid crystal device were measured but no difference was observed, compared to a conventional single material film. Further, durability was evaluated under the conditions of 60° C.×90% R.H. but problems such as insufficient orientation were not caused.

EXAMPLE 23

A glass substrate having a diagonal of 5 inches was provided. An ITO (Indium Tin Oxide) transparent electrode was formed thereon by sputtering and then worked into 321 stripe electrodes each having a width of about 150 μm by using the photolithographic method. End portions of the patterns were subjected to patterning to a predetermined shape and were capable of connecting an IC for liquid crystal driving at post-treatment.

Pigment films of three primary colors of R, G and B were formed on the stripe patterns. To form the pigment films, electrolyte aqueous solutions having compositions shown in Table 5 in which an organic pigments are colloidally dispersed where used. The pigment films of R, G and B were formed in the respective electrolyte solution by selectively passing a current through a specific transparent electrode to arrange R, G and B, alternately and repeatedly.

The electrolysis potential was made 0.4 V (vs. S.C.E.) and a Pt plate was used as an opposite electrode. The pigment films were formed so that the film thickness of R was 0.9 μm, G was 1.2 μm and B was 0.7 μm. The order of formation was R, G and B. After formation of each film, the substrate was washed in pure water and then sintered at 180° C. for 30 minutes.

TABLE 5

| Dye film | Organic pigment used | Organic pigment concentration | Sur- factant | Supporting electrolyte |
| --- | --- | --- | --- | --- |
| R | Dianthraqui- nonyl red | 5 g/l | 1.5 mM | 0.1M |
|  | Disazo yellow | 1 g/l |  |  |
| G | Phthalocya- nine green | 11 g/l | 1.5 mM | 0.1M |

TABLE 5-continued

| Dye film | Organic pigment used | Organic pigment concentration | Sur- factant | Supporting electrolyte |
| --- | --- | --- | --- | --- |
|  | Disaxo yellow | 2 g/l |  |  |
| B | Phthalocya- nine blue | 6 g/l | 1.0 mM | 0.1M |
|  | Dioxazine violet | 1 g/l |  |  |

Surfactant: Ferrocenyl PEG (produced by Dojin Kagaku Co.)
Supporting electrodes: Lithium sulfate A transparent polymer material was then formed on each of the pigment films. The polymer material was formed by selectively passing current through an electrode having a pigment film thereon. A 0.5 μm thick polymer film was formed on the R film, a 0.2 μm thick polymer film was formed on the G film and a 0.7 μm thick polymer film was formed on the B film. The total thickness of the pigment films was 1.4 μm.

To form the polymer material, an aqueous electrolyte (produced by K.K. Shimizu) was prepared including acrylic acid and melamine with a ratio of 7:3 and isopropyl alcohol and butyl cellosolve. The polymer material of this Example can be formed by electrodeposition, which was conducted with a Pt plate as an opposite electrode and applying a voltage of 3.5 V (vs. S.C.E.). After the electrodeposition, the formed material was washed in pure water for 30 seconds and then sintered at 180° C. for 30 minutes. A color filter having a stripe pattern wherein the pigment layer includes organic pigment polymer material and the three primary colors, R, G and B have the same film thickness was obtained.

An STN color liquid crystal panel was prepared with the color filter by passing through the predetermined liquid crystal panel making procedure. Display unevenness of the panel was evaluated by driving it with 1/240 duty. The panel exhibited excellent results.

EXAMPLE 24

Using the procedure of Example 23, a pigment layer was formed with a thickness of 1.8 μm. The layer included pigment and polymer material and was used to prepare a liquid crystal panel. The liquid crystal driving property was somewhat lowered due to the thick pigment layer, but no display unevenness such as fluctuation in contrast occurred.

In Example 23 and Example 24 a polymer material formed at a portion other than on the pigment film is prevented by previously coating a resist at a portion where polymer material is not desired.

EXAMPLE 25

To unify the thickness of each pigment film, organic polymer was codeposited with the pigment material. A glass substrate having a diagonal of 5 inches was provided. An ITO (Indium Tin Oxide) transparent electrode was formed thereon by sputtering 320 stripe pattern electrodes, each having a width of about 150 μm by the photolithographic method. End portions of the patterns were subjected to patterning to a predetermined shape to be capable of connecting an IC for liquid crystal driving. Pigment films of three primary colors of R, G and B were formed on the stripe pattern by selectively passing a current through the stripe electrode to repeatedly arrange R, G and B in this order.

One liter of an electrolyte having the composition shown in Table 6 was prepared and the substrate was immersed therein. Electrolysis was performed to form a pigment thin film of R only on selected portions of the stripe pattern of the transparent electrode. At this time, polypropylene, an organic polymer to be codeposited was used. Accordingly, the thin film of R included codeposited polypropylene.

TABLE 6

| Organic pigment | Organic polymer | Surfactant | Supporting electrolyte |
|---|---|---|---|
| Dianthraqui-nonyl red 6 g/l | Polypro-pylene 3 g/l | Ferrocenyl PEG* 1.5 mM | Li₂SO₄ 0.1M |

*produced by Dojin Kagaku Co.

The electrolysis potential was 0.4 V (vs. S.C.E.) and a Pt plate was used as an opposite electrode. The film thickness of pigment+organic polymer was made to be 1.3 µm and it had adequate color tone. After the film was formed, it was dried at 150° C. for 10 minutes. Peel off of the film did not occur at film formation or during water washing after formation of the film.

Thereafter, one liter of an electrolyte having the composition shown in Table 7 was prepared and the above substrate and R pigment thin film was immersed therein. Electrolysis was performed to form a pigment thin film of G only on the predetermined stripe patterns of the transparent electrode. Polypropylene was again codeposited with the G pigment. When a G color thin film is formed of only pigment, color tone is usually sufficient with a 1 µm thick film. 0.9 µm is typically sufficient for an R color film. Accordingly, the composition ratio of the organic polymer codeposited with the G pigment was somewhat decreased, compared to the ratio in the above electrolyte of R, whereby the codeposited amount of polymer was somewhat decreased and the layers could be formed to the same size.

TABLE 7

| Organic pigment | Organic polymer | Surfactant | Supporting electrolyte |
|---|---|---|---|
| CuPcClBr* 14 g/l | Polypro-pylene 2 g/l | Ferrocenyl PEG* 2.5 mM | Li₂SO₄ 0.1M |

*Brominated chlorinated copper phthalocyanine.

The electrolysis potential was 0.4 V (vs. S.C.E.) and a Pt plate was used as an opposite electrode. The film thickness of pigment and polymer was made 1.3 µm as in the above R layer. No problem in color tone was observed after the film was formed, it was dried at 150° C. for 10 minutes. Peel off of the film was not observed during film formation or during water washing.

Subsequently, one liter of an electrolyte having the composition shown in table 8 was prepared, and the substrate having the R and G layers was immersed therein. Electrolysis was performed to form a pigment thin film of B on the remaining stripe pattern of the transparent electrode. Polypropylene was again codeposited with the B pigment material. A 0.7 µm thick film of the B pigment material typically has sufficient color tone. Accordingly, the composition ratio of the organic polymer was somewhat increased compared to the electrolyte of R pigment so that the B layer had the same film thickness as the R and G pigment films and sufficient in color tone.

TABLE 8

| Organic pigment | Organic polymer | Surfactant | Supporting electrolyte |
|---|---|---|---|
| CuPcCl* 7 g/l | Polypro-pylene 5 g/l | Ferrocenyl PEG* mM | Li₂SO₄ M |

*Monochloro copper phthalocyanine.

The electrolysis potential was the same as above. The film thickness was made 1.3 µm (pigment+organic polymer) as in the other pigment films. There was no problem in color tone. After formation of the film, the film was dried at 150° C. for 10 minutes. Peel off of the film did not occur ding film formation or during water washing after the formation of the film.

A color filter was thereby formed with codeposited films of organic pigments and organic polymers. Each color film had the same film thickness in each of the three primary colors of R, G and B.

Using this color filter, an STN color liquid crystal panel was prepared by passing through the predetermined liquid crystal panel making process. The processing temperatures in each process was made 150° C. or below. Display unevenness (fluctuation in contrast) of the panel was evaluated by driving it with 1/240 duty and no problems were observed.

EXAMPLE 26

A glass substrate having a diagonal of 2.6 inches was provided. An ITO (Indium Tin Oxide) film was formed as a transparent electrode by sputtering 300 stripe electrodes, each having a width of 100 µm and a line pitch of 130 µm as shown in FIG. 3.

Figure 3:
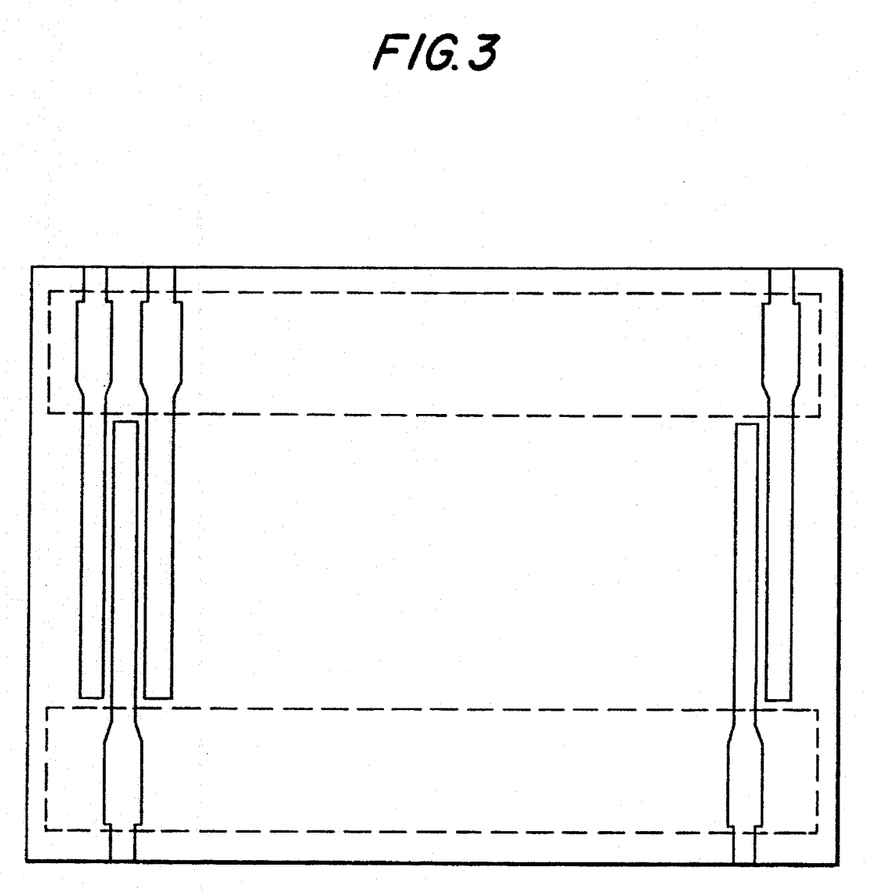
FIG. 3 is a schematic plan view of a resist-coated color filter formed in accordance with the invention.

An alkali soluble type thermosetting resist UDE-203 produced by Taiyo Ink Co. was applied by screen printing at the dotted line portions in FIG. 3 to cover portions at which it is undesirable to form pigment.

Next, micellar colloidal aqueous solutions of red, green and blue organic pigments having compositions shown in Table 9 were prepared and each pigment film was formed by electrolysis. After the electrolytic film formation, washing with water was carried out and after confirming that no micellar colloidal aqueous solution remained between the resist and the glass, the next step was carried out.

TABLE 9

| Pigment | Pigment concentration | Surfactant | Supporting electrolyte |
|---|---|---|---|
| 1 Red | 6 g/l | 1.5 mM | 0.05M |
| 2 Green | 14 g/l | 1.5 mM | 0.05M |
| 3 Blue | 7 g/l | 1.5 mM | 0.05M |

Surfactant: Ferrocenyl PEG (produced by Dojin Kagaku Co.) (which can be oxidized and reduced by electrolysis)
Supporting electrolyte: Lithium bromide
Red Pigment: Anthraquinone series pigment
Green Pigment: Brominated chlorinated copper phthalocyanine
Blue Pigment: α type copper phthalocyanine Electrolysis potential was made 0.4 V (vs. S.C.E.) and electrolysis time was adjusted to make each pigment film 1.0 µm thick. The pigment thin layer was formed by selectively passing current through selected electrodes during electrolysis to yield repeated stripe patterns of red, green and blue. After film formation, the formed material was sintered at 150° C. for 30 minutes. Pigment thin films of the repeated stripe pattern of the three colors of red, green and blue were formed.

The substrate and pigment thin films were immersed in a polymer precursor solution and electrodeposition of the polymer precursor was conducted by utilizing the transparent electrode on which the pigment thin films were formed as an electrode for electrodeposition. The polymer precursor solution was an aqueous solution containing acrylic acid and melamine with the ratio of 7:3 and also containing isopropyl alcohol and butyl cellosolve (produced by K.K. Shimizu). It was used after adjusting the concentration of acrylic acid+ melamine to 5% by weight.

Electrodeposition was conducted by utilizing the transparent electrode on which the pigment thin films had been formed as an anode and applying +3.5 V between the anode and an opposite electrode made of platinum for 5 minutes. After electrodeposition, the substrate was washed in pure water for 30 seconds, spin dried then sintered at 150° C. for 30 minutes.

An acryl-melamine polymer was formed in the pigment films and a 0.05 μm thick layer of the polymer film was formed on the pigment films. Afterwards, to eliminate the resist, the substrate was dipped in a 10% KOH solution at 40° C. for one minute, washed with water sufficiently and then neutralized by dipping in a 5% $H_2SO_4$ solution for one minute and then washed with water.

The surface of the color filter was observed and pigment film was not formed at an IC connecting portion of the liquid crystal panel or at a sealing portion. Pigment film also did not remain at the boundary line of the resist film and the glass substrate.

Using a TN type liquid crystal, a color liquid crystal panel was prepared and the driving characteristics and durability of the liquid crystal panel were examined. No problems were observed with the driving characteristics and no difference was observed compared with a conventional color filter. Regarding the durability, it was substantially the same as those of a TN liquid crystal panel having no color filter.

EXAMPLE 27

A resist was formed by offset printing on a portion of a glass substrate having an ITO pattern in which the pigment films were not desired as in Example 26. The resist was formed with 0.1% by weight of a fluoro coating agent FX-3325 (produced by Sumitomo Three M) added to UDE-203 of Example 26. A color filter was prepared following the same procedures as in Example 26.

The surface of the color filter was observed and no pigment film was formed at an IC connecting portion of the liquid crystal panel or at a sealing portion. Pigment did not remain at the boundary line of the resist film and the glass substrate. A color liquid crystal panel was prepared using a TN type liquid crystal material and the driving characteristics and durability of the liquid crystal were substantially the same as those in Example 26.

EXAMPLE 28

UV curing type resist ink 81108(2) (produced by Okuno Seiyaku K.K.) was used as a resist material and 0.05% by weight of a fluorine type surfactant, Florade (produced by Sumitomo 3M) FC-725 was added therein. Using this resist material, a color filter was prepared according to the same procedures of Example 26. Pigment film did not remain at the boundary line of the resist film and the glass substrate although washing with water had not been carried out.

A color liquid crystal panel was prepared using a TN type liquid crystal material in the same manner as mentioned above. The driving characteristics and durability of the liquid crystal were substantially the same as those in Example 26.

As can be seen in the Examples, the method of forming a color filter in accordance with the invention provides acceptable film conductivity, adhesion, smoothness, uniform thickness and prevents pigment films from forming at undesirable portions.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A colored article suitable for use as a color filter for a liquid crystal display device, comprising:
    a transparent substrate;
    a transparent electrode on the transparent substrate; and
    a thin film including an organic pigment on the transparent electrode, the pigment deposited by electrolysis from a solution containing a surfactant for solubilizing the pigment in an aqueous micelle solution, and conductive polymer material deposited over the pigment.

2. The colored article of claim 1, wherein the thin film consists essentially of pigment and conductive powder.

3. The colored article of claim 1, wherein the thin film consists essentially of pigment and polymer material.

4. The colored article of claim 1, wherein the thin film consists essentially of pigment and conductive polymer material.

5. The colored article of claim 1, wherein the thin film includes pigment and conductive powders selected from the group consisting of ITO, $SnO_2$, SNO, ZnO, carbon and combinations thereof.

6. The colored article of claim 1, wherein the thin film includes pigment and a polymer selected from the group consisting of pyrrol, pyrrol derivatives, aniline, aniline derivatives, thiophene, thiophene derivatives, acryl-melamine polymer, poly-N-methylpyrrol, polyparabanic acid resin, polyimide and polypropylene.

7. The colored article of claim 1, wherein the thin film includes pigment and polymer and the polymer is formed by immersing a pigment thin film in a polymer precursor solution and then curing the polymer.

8. The colored article of claim 1, wherein the thin film includes pigment and polymer and the polymer is formed by codepositing polymer precursor with the pigment material and then curing the polymer.

9. The colored article of claim 1, wherein the thin film includes pigment and polymer and the polymer is formed by electrolytic polymerization.

10. The colored article of claim 1, wherein the thin film has a smooth surface.

11. The colored article of claim 1, wherein the thin film is formed of at least one layer of pigment material and one layer of pigment combined with polymer or conductive polymer.

12. The colored article of claim 1, wherein the pigment is deposited from a solution including both pigment and polymer precursor and the pigment layer is deposited by applying voltage high enough to deposit pigment, but not high enough to deposit polymer precursor.

13. The colored article of claim 1, wherein the pigment and conductive polymer is 0.2 μm to 1.8 μm thick.

14. The colored article of claim 13, wherein polymer or conductive polymer are also present within the pigment layer.

15. The colored article of claim 1, including at least three different colored thin films, each having the same thickness.

16. The colored article of claim 1, wherein the organic pigment and conductive polymer have a resistivity of $1\times10^7$ $\Omega.cm$ to $1\times10^5$ $\Omega.cm$.

17. The colored article of claim 1, wherein the pigment is one of insoluble and sparingly soluble in water.

18. A color filter, comprising:

a transparent substrate and a transparent electrode thin film selectively formed thereon; and a film on the electrode formed by immersing the transparent electrode substrate in a micellar aqueous solution of a surfactant having a redox reactivity having an organic pigment dispersed therein colloidally and subjected to electrolysis, the film including the organic pigment and conductive polymer material deposited on the layer of pigment.

19. The color filter of claim 18, wherein the layer of pigment and conductive polymer have a thickness of 0.2 μm to 1.8 μm.

20. The color filter of claim 18, wherein the material on the electrode has a resistivity of from $1\times10^5$ $\Omega.cm$ to $1\times10^7$ $\Omega.cm$.

* * * * *